United States Patent [19]
Bordogna et al.

[11] Patent Number: 6,137,790
[45] Date of Patent: *Oct. 24, 2000

[54] CONTROL ARCHITECTURE FOR A HOMOGENEOUS ROUTING STRUCTURE

[75] Inventors: Mark Aldo Bordogna, North Andover, Mass.; Philip Sidney Dietz, East Hampstead, N.H.; Joseph Elide Landry, Atkinson, N.H.; Jeffrey Robert Towne, Litchfield, N.H.; Warren Clifton Trested, Jr., E. Hampstead, N.H.

[73] Assignee: Lucent Technologies Inc., Murray Hill, N.J.

[*] Notice: This patent is subject to a terminal disclaimer.

[21] Appl. No.: 08/942,096

[22] Filed: Oct. 1, 1997

[51] Int. Cl.$^7$ .................................................. H04Q 11/00
[52] U.S. Cl. .............................................................. 370/351
[58] Field of Search ................................... 370/351, 360, 370/680, 384, 386, 388, 375, 392, 400, 401, 244, 352, 389, 395, 465

[56] References Cited

U.S. PATENT DOCUMENTS

| | | | |
|---|---|---|---|
| 4,847,877 | 7/1989 | Besseyre | 375/368 |
| 5,008,882 | 4/1991 | Peterson et al. | 370/406 |
| 5,465,256 | 11/1995 | Fowler | 370/522 |
| 5,636,203 | 6/1997 | Shah | 370/244 |
| 5,838,684 | 11/1998 | Wicki et al. | 370/416 |

*Primary Examiner*—Dang Ton
*Attorney, Agent, or Firm*—Gregory J. Murgia

[57] ABSTRACT

A system for providing segmented control of a single, homogeneous routing structure, such as a switch fabric, includes application control elements that are each responsive to embedded signal status information for each of the input signals to the switch fabric. Within each of the application control elements, a configurable arrangement of selectors and control logic is used to provide domain segmented control of each of the separate switching functions for a particular application. Each application control element performs an application specific address resolution function to resolve a single address of one of the input signals based on the embedded signal status of each of the input signals. This single address is provided to the switch fabric so that the corresponding input signal can be selected at the switch fabric output. Because embedded signal status is provided locally at each selection point within the application control element, the control functions for each of the separate switching functions are decoupled, and, as a result, each of the separate switching functions can be independently controlled as a separate domain within the application control element. The single, homogeneous switch fabric simultaneously supports multiple applications in parallel because each of the application control elements is used to control a separate output from the switch fabric. Because of the one for one association between application control elements and switch fabric outputs, the switch fabric is effectively "channelized" whereby each channel of the switch fabric supports a separate application.

27 Claims, 7 Drawing Sheets

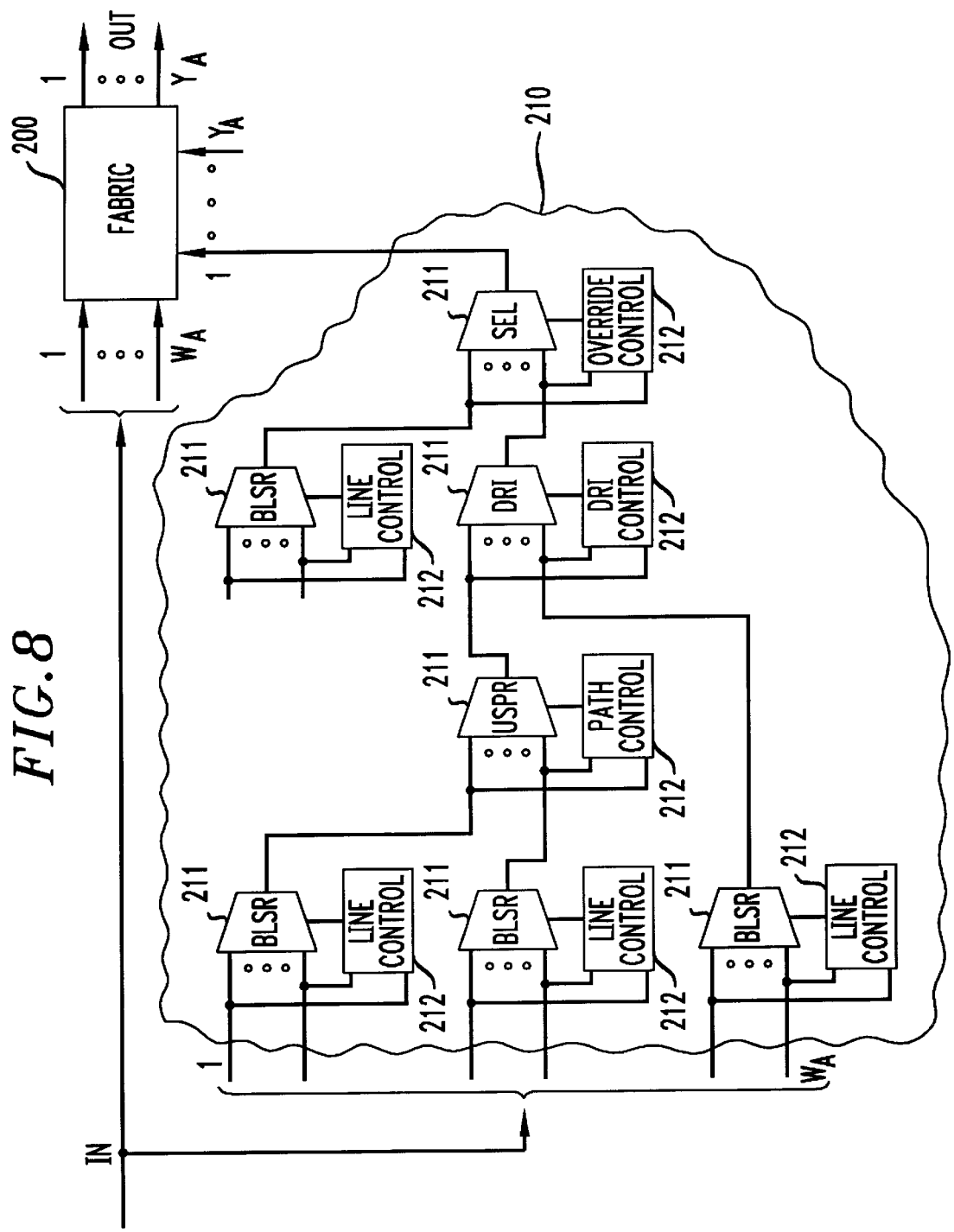

CONTROL ARCHITECTURE FOR A HOMOGENEOUS ROUTING STRUCTURE

CROSS REFERENCES TO RELATED APPLICATIONS

U.S. patent application Ser. No. 08/942,095, entitled "A Control Architecture Using an Embedded Signal Status Protocol" (Bordogna 3-6-7-1-2) was filed Oct. 1, 1997.

FIELD OF THE INVENTION

This invention relates generally to digital transmission networks and, more particularly, to a control architecture for homogeneous routing structures, such as centralized switch fabrics used in network elements.

BACKGROUND OF THE INVENTION

Digital transmission networks, such as those based on Synchronous Optical Network/Synchronous Digital Hierarchy (SONET/SDH) standards, are used extensively for transporting broadband communications signals. Network elements, such as multiplexers, digital cross-connect systems, and the like, are used in these transmission networks to support a number of different applications, including some that involve multiple switching or routing functions. One example of an application with multiple switching functions is "path-in-line" protection switching, also referred to as "virtual rings" or "ring-on-ring", which involves line switching over bi-directional line switched rings (BLSR) and path switching over unidirectional path switched rings (UPSR).

To support these types of applications, some network elements include a routing structure, such as a switch fabric, to provide the necessary connections for switching signals through the transmission network. Switch fabrics are typically either centralized or distributed, with the former comprising a single, homogeneous fabric that is used for all switching functions and the latter comprising two or more switch fabrics linked together to perform the switching functions. With regard to multiple switching functions, one of the more significant factors affecting overall performance of the switch fabric is the manner in which the switch fabric is controlled. In practice, a common control arrangement is typically used for a centralized switch fabric, while a segmented control arrangement has traditionally only been used for distributed switch fabrics. Consequently, distributed switch fabrics have been the logical choice for supporting applications involving multiple switching functions because a separate control domain and separate switch fabric can be used to support each separate switching function. However, distributed switch fabrics have many disadvantages, including: added cost for the multiple fabrics, slower connections, less design flexibility, and increased physical space and power requirements.

Although centralized switch fabrics offer several advantages over distributed switch fabrics, centralized switch fabrics are known to have problems with applications that involve multiple switching functions. Many of these problems relate to the inherent complexity of the common control arrangement. For example, the control functions for each of the multiple switching functions must be closely coupled in a common control arrangement so that the multiple switching functions can be properly sequenced and prioritized for the single, homogeneous switch fabric. As a result of the extensive coordination required among the various control functions to carry out the sequencing and prioritizing, these common control arrangements typically fail to meet many of the performance requirements for a given application, especially time-based performance requirements.

SUMMARY OF THE INVENTION

In the present invention, a control system provides segmented control of a single, homogeneous routing structure by using a number of application control elements that are each responsive to embedded signal status of the input signals to the routing structure. Within each of the application control elements, a configurable arrangement of selectors and control logic is used to provide segmented control of each of the separate switching functions for a particular application. Each application control element performs an application specific address resolution function by using an appropriate configuration of selectors and control logic to resolve a single address of one of the input signals based on the embedded signal status of each of the input signals. This single address is provided to the routing structure so that the corresponding input signal can be selected at the routing structure output.

According to one aspect of the present invention, domain-segmented control is provided within each application control element by selectively configuring the application control element with the appropriate arrangement of selectors and control logic to support each of the separate switching functions. Because embedded signal status is provided locally at each selection point within the application control element, the control functions for each of the separate switching functions do not have to be coupled together as in the prior art common control arrangements. As a result, each of the separate switching functions can be independently controlled as a separate domain within the application control element. Furthermore, the present invention offers a simpler control arrangement as compared with the prior art systems that require complex control for sequencing and prioritizing the centralized switch fabric to support multiple switch functions within an application.

According to another aspect of the present invention, the single, homogeneous routing structure can simultaneously support multiple applications in parallel because each of the application control elements is used to control a separate output from the routing structure. Because of the one for one association between application control elements and routing structure outputs, the routing structure is effectively "channelized" whereby each channel of the routing structure supports a separate application.

BRIEF DESCRIPTION OF THE DRAWING

A more complete understanding of the present invention may be obtained by reading the following detailed description of the invention in conjunction with the appended drawing, with like elements referenced with like references, in which:

FIG. 8 shows the configuration of FIG. 7 implemented for path-in-line protection switching.

DETAILED DESCRIPTION OF THE INVENTION

It is well known that protection switching schemes are typically used in SONET/SDH networks so that communications can be maintained even if there are defects or failures on a given transmission path. Some examples of the types of network protection switching schemes used in SONET/SDH include: bi-directional line switched ring (BLSR), unidirectional path switched ring (UPSR), dual ring interworking (DRI), and 1+1 facility protection to name a few. Although the present invention is particularly well-suited for a "path-in-line" protection switching application in a SONET/SDH-based transmission network, and shall be described in the context of this application, those skilled in the art will understand from the teachings herein that the present invention can also be used in many other applications that would benefit from independently controlling multiple functions in a centralized, homogeneous routing structure.

In the context of the following detailed description, the term "routing structure" is intended to encompass all the various components known in the art that are used for routing, switching, or connecting signals. One example of a routing structure is a switch fabric that is used in a network element for a digital transmission system. However, any type of signal interface that makes routing selections or decisions would be a suitable equivalent to the switch fabric. Therefore, the examples used throughout the detailed description are illustrative only and many other suitable routing structures may be used in conjunction with the present invention.

Figure 1A:
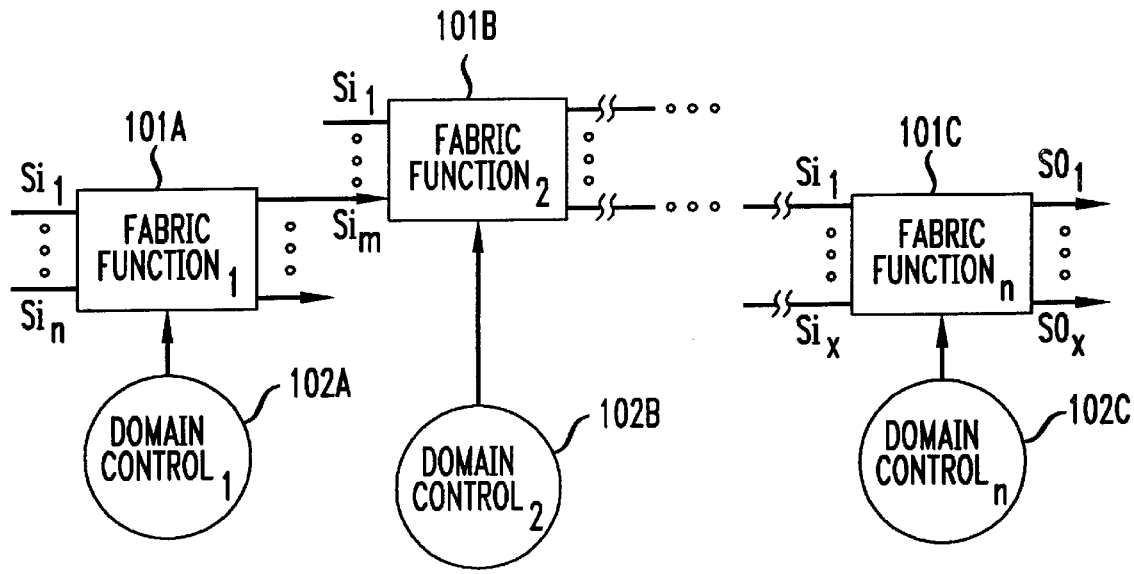
FIG. 1A is a simplified block diagram showing a typical distributed switch fabric architecture and control arrangement used in prior art systems.
Figure 1B:
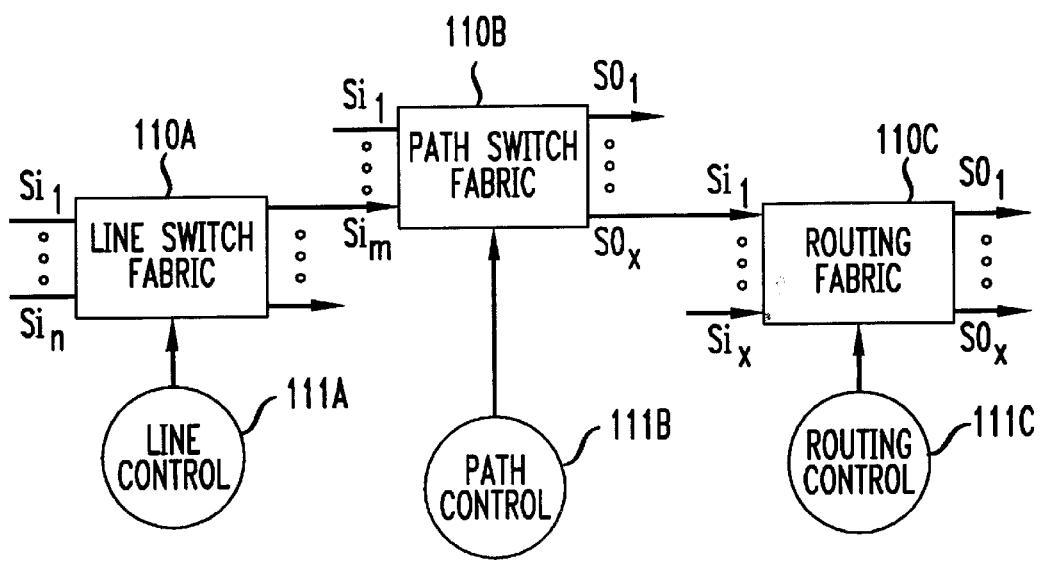
FIG. 1B shows the configuration of FIG. 1A implemented for path-in-line protection switching.

In existing network elements (NEs), such as a digital cross-connect system (DCS), a single switch fabric with an associated control function is generally used to implement a single switching function. As shown in FIG. 1A, a prior art arrangement for handling multiple switching functions requires multiple switch fabrics, each having a corresponding domain control. In general, fabric functions$_{1-n}$ 101A, 101B, 101C implement the necessary connections between system inputs $S_i$ and system outputs $S_o$ according to control supplied by domain controls$_{1-n}$ 102A, 102B, 102C. FIG. 1B shows a practical implementation of a prior art path-in-line protection switching arrangement that spans two or more switch fabrics each having its own control input. As shown, a separate fabric function 110A, 110B, 110C and domain control 111A, 111B, 111C is used for the line switching, path switching, and routing functions, respectively. As previously described, prior art systems utilizing a distributed fabric architecture have numerous disadvantages. In general, the present systems do not provide a performance-optimized control architecture that supports the multiple switching and cross-connection functions required for time-critical applications such as protection switching. As an additional disadvantage, multiple layers of fabric and control would be required in order to simultaneously support multiple applications in parallel, thereby adding to the cost and complexity of the system.

The present invention fills this need and others by providing domain-segmented control of multiple selection and switching functions in a single, homogeneous switch fabric using independent application control elements. Within each of the application control elements, a configurable arrangement of selectors and control logic is used to carry out an application specific address resolution function to resolve a single address of one of the input signals to the switch fabric based on an embedded signal status. This single address is provided to the switch fabric so that the corresponding input signal can be selected as the switch fabric output. Because embedded signal status is provided locally at each selection point within the application control element, the control functions for each of the separate switching functions are decoupled, and, as a result, each of the separate switching functions can be independently controlled as a separate domain within the application control element. In addition, the single, homogeneous switch fabric simultaneously supports multiple applications in parallel because each of the application control elements is used to control a separate output from the switch fabric. Because of the one for one association between application control elements and switch fabric outputs, the switch fabric is effectively "channelized" whereby each channel of the switch fabric supports a separate application. It is to be understood that the terms "application control element", "application specific address resolution function", and "application control set" are used herein interchangeably to refer to an arrangement of selection and control logic used for resolving an address of an input signal to the switch fabric.

Figure 2:
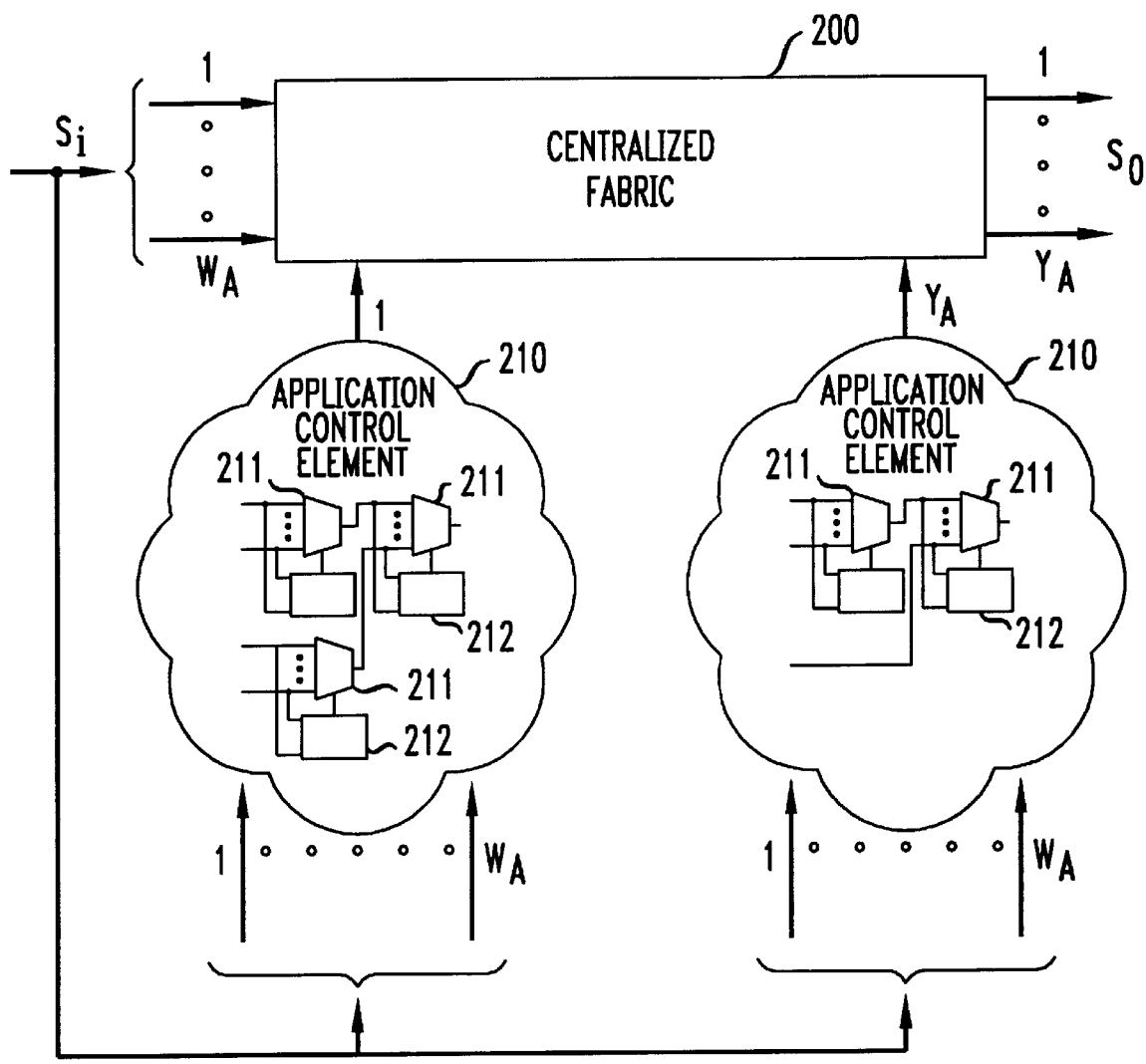
FIG. 2 is a simplified block diagram of a segmented control arrangement for a homogeneous switch fabric according to the principles of the present invention.

More specifically, as shown in FIG. 2, centralized switch fabric 200 receives a number of system inputs $S_i$, represented as 1-$W_A$ inputs, and generates a number of system outputs $S_o$, represented as 1-$Y_A$ outputs. Independent application control elements 210 are coupled to switch fabric 200 with the number of application control elements 210 being equal to the number of system outputs $S_o$ so that each of the 1-$Y_A$ control inputs to switch fabric 200 is independently mapped to one of the 1-$Y_A$ system outputs $S_o$ in a corresponding relationship. The address information and signal status information for the 1-$W_A$ system inputs is provided as input to each of the application control elements 210.

In one embodiment, multi-stage, application specific address resolution functions 210 are configured to perform appropriate selection functions to resolve a single address and to provide this address information to switch fabric 200 as a control input. Specifically, each application specific address resolution function 210 includes a number of logic stages comprised of selectors 211 and domain control functions 212. Each application specific address resolution function 210 is adapted to receive the address and signal status information from the 1-$W_A$ system inputs and is further adapted to perform selection functions to generate the single control input based on the signal status information. Typically, the single control input would include the address of the input that is to be selected by switch fabric 200.

Each application specific address resolution function 210 is a complex control structure that carries out multiple selection and control functions using an aggregation of multiple selectors 211 and domain control functions 212 to generate a single control input for switch fabric 200. Domain-segmented control is achieved within each application specific address resolution function 210 by selectively configuring the application specific address resolution function 210 with the appropriate number and arrangement of selectors 211 and domain control functions 212 to support each of the separate switching functions. Because signal status is provided locally at each selection point within the application specific address resolution function 210, each of the separate switching functions can be independently controlled as a separate domain within the same application specific address resolution function 210. In effect, by selectively configuring application specific address resolution function 210 to generate a single control input based on the address and signal status of multiple system inputs, application specific address resolution function 210 is performing a control arbiter function. The control arbiter function of application specific address resolution function 210 is "resolving" a single control input from among the various system inputs, where the single control input would include the address of the input that is to be selected by switch fabric 200. By contrast with the prior art common control arrangements, the control arbiter function in the present invention therefore provides a capability for sequencing and prioritizing complex routing requests for each fabric output.

Because each application specific address resolution function 210 is independent from each other, each application specific address resolution function 210 can be configured to provide "resolved" control of a single system output $S_o$ so that centralized switch fabric 200 can support 1-$Y_A$ separate applications. In other words, each of the 1-$Y_A$ outputs from switch fabric 200 is associated with a unique control arbiter function in a one-to-one association. As a result, switch fabric 200 is able to simultaneously support multiple applications in parallel because switch fabric 200 is effectively "channelized" with each channel being capable of supporting a separate application.

Switch fabric 200 can be implemented as a bit-sliced hardware fabric comprised of multiple selector elements or any other suitable means known in the art, such as link lists and the like. Regardless of the fabric implementation, the control architecture of the present invention allows switch fabric 200 to support multiple applications as well as multiple functions within an application. More specifically, each application control element 210 could be used to support a separate application, while domain control functions 212 could be used to support the multiple functions within a particular application control set 210. Using SONET/SDH as an example, applications may include path-in-line protection switching, hardwired cross-connect applications, and maintenance applications. Multiple functions within a path-in-line protection switching application, for example, may include line switching, path switching, and a routing function.

Figure 3:
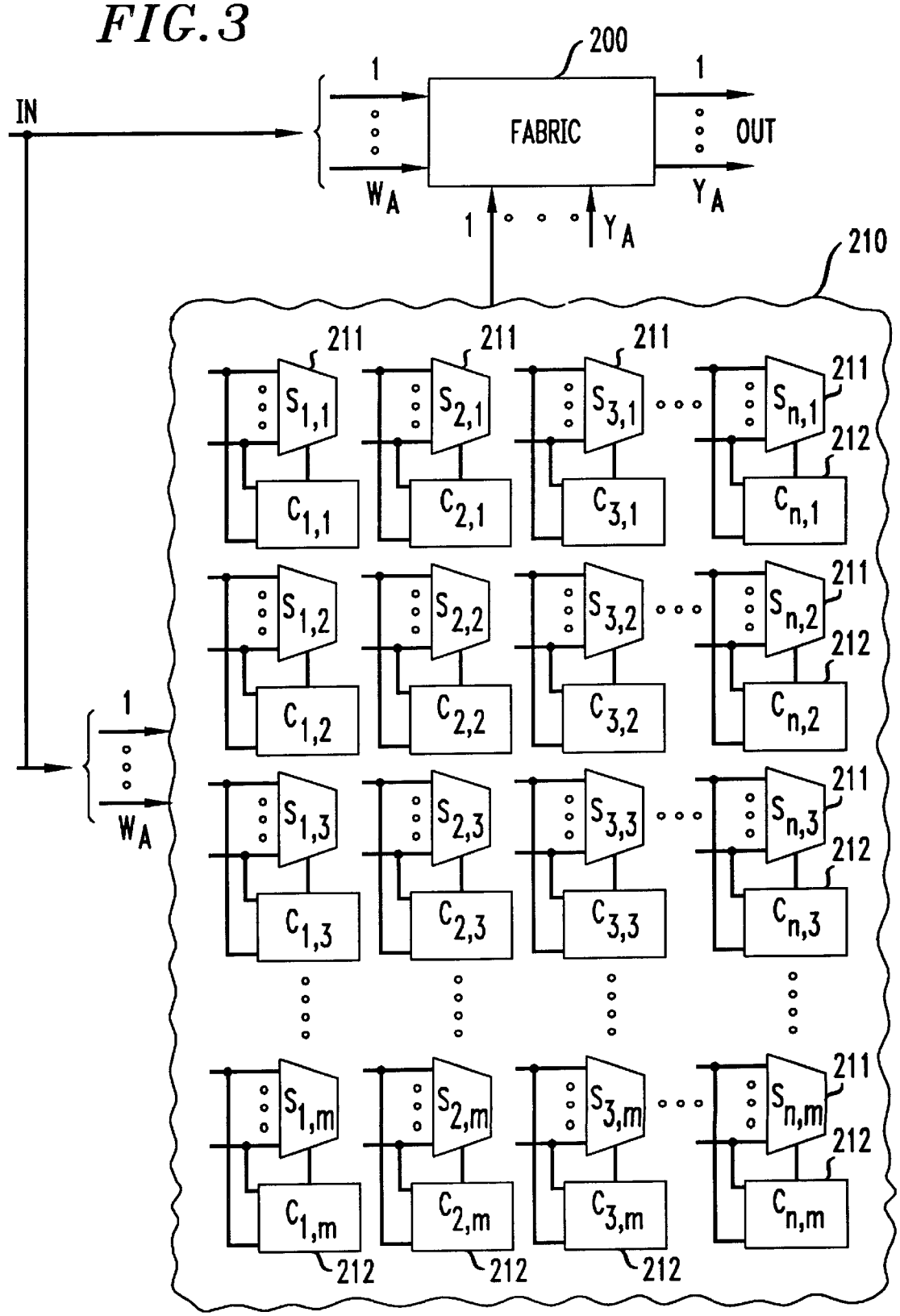
FIG. 3 shows an expanded view of the multi-stage application specific address resolution function used in the segmented control arrangement of FIG. 2.

FIG. 3 shows an expanded view of a practical implementation of application specific address resolution function 210 from FIG. 2. Specifically, application specific address resolution function 210 is configured as an m×n array, where n represents the number of application selection stages and m represents the number of elements within a particular stage. In this particular implementation, application specific address resolution function 210 includes selectors $S_{(i,j)}$ 211 and corresponding domain control functions $c_{(i,j)}$ 212, where $1 \leq i \leq n$ and $1 \leq j \leq m$. For example, the first application selection stage of application specific address resolution function 210 would include selectors $S_{(1, 1)}$ through $S_{(1, m)}$ and the final application stage would include selectors $S_{(n, 1)}$ through $S_{(n, m)}$. Accordingly, application specific address resolution function 210 can be selectively configured, e.g., via software, to include as few as one stage with one selector up to n stages with each stage having up to m selectors.

In general, each selector $S_{(i, j)}$ 211 would include at least two inputs, only one output, and one control input. The input lines to selectors $S_{(i, j)}$ 211 within application specific address resolution function 210 can either be real or virtual inputs or a combination of both. System inputs 1-$W_A$ to application specific address resolution function 210 are considered real inputs while any output from a particular selector $S_{(i, j)}$ 211 within application specific address resolution function 210 can be a virtual input to a subsequent selector $S_{(i, j)}$ 211 within the same application specific address resolution function 210. The system inputs to application specific address resolution function 210 include the address information and signal status information for each of the system inputs. Any real input to application specific address resolution function 210 can be an input to any number of selectors $S_{(i, j)}$ 211 within application specific address resolution function 210. Thus, an input to any selector $S_{(i, j)}$ 211 in application specific address resolution function 210 can either be any output from any selector $S_{(i, j)}$ 211 in an earlier stage (i.e., a virtual input) or any of the system inputs to application specific address resolution function 210 (i.e., a real input). Because there is only one output per application specific address resolution function 210, the last selector $S_{(i, j)}$ 211 in the last application selection stage n of application specific address resolution function 210 will have a real output which is provided as the control input to switch fabric 200.

It should be noted that although FIG. 3 shows one implementation of application specific address resolution function 210 using selectors $S_{(i, j)}$ 211, those skilled in the art will understand that other suitable implementations are possible without departing from the spirit and scope of the present invention. In general, there are many suitable hardware-based and software-based logic implementations contemplated by the present invention. By way of example only, the complex control function provided by application specific address resolution function 210 can be carried out with logic implemented in hardware or software or with microprocessors programmed to execute appropriate algorithms, and the like.

In operation, 1-$W_A$ system inputs are provided to switch fabric 200, while the address and signal status information corresponding to each of the 1-$W_A$ system inputs is provided to various selectors $S_{(i, j)}$ 211 in application specific address resolution function 210. For any given application, application specific address resolution function 210 is configured with the appropriate number and arrangement of selectors $S_{(i, j)}$ 211 and associated domain control functions $c_{(i,j)}$ 212 to provide the necessary control arbiter function for selecting a single input that is provided to switch fabric 200. More specifically, each active selector $S_{(i, j)}$ 211 within application specific address resolution function 210 selects an output from one of its inputs based on the control input from the corresponding domain control function $c_{(i,j)}$ 212. Accordingly, the control input from the domain control function $c_{(i,j)}$ 212 determines which of the inputs will be selected as the output of the corresponding selector $S_{(i, j)}$ 211. Inputs to the individual domain control functions $c_{(i,j)}$ 212 are the address and signal status information of the input lines to the corresponding selector $S_{(i, j)}$ 211. As noted, these input lines to selectors $S_{(i, j)}$ 211 in application specific address resolution function 210 may be real or virtual inputs or a combination of both. The virtual inputs will include the signal status information that propagates through the system along with the address of the input signal, while the real inputs only include the address of the input signal. Application specific address resolution function 210 performs the appropriate selection functions based on the signal status information using selectors $S_{(i, j)}$ 211 and associated domain control functions $c_{(i,j)}$ 212 and resolves a single control input containing the address information for one of the system inputs to be selected by switch fabric 200. In response to the control input generated by application specific address resolution function 210, switch fabric 200 then performs the appropriate selection/switching function to select the desired output from among the system inputs. In simplified form, application specific address resolution function 210 is resolving address information for system inputs 1-$W_A$ based on the signal status of the particular system inputs.

Alternatively, application specific address resolution function 210 may be resolving address information for a non-system input to switch fabric 200. For example, the control input from application specific address resolution function 210 may be an address of a specialized signal (e.g., an Alarm Indication Signal (AIS) for SONET). In other words, in response to the control input from application specific address resolution function 210, switch fabric 200 may choose either a real input, such as a system input, or an internally synthesized input. An internally synthesized input could be any of a number of different types of specialized inputs, such as signals generated by an internal signal generator, a maintenance signal generator, test signal generator, and the like. These internally synthesized inputs could also be command requests or status insertions. In any case, application specific address resolution function 210 provides the resolved address to switch fabric 200 to effect an appropriate selection decision.

For a multiple application specific address resolution function configuration, the control inputs 1-$Y_A$ correspond on a one-to-one basis to outputs 1-$Y_A$ from switch fabric 200. Stated otherwise, each application specific address resolution function 210 controls one of the output lines from switch fabric 200. Because control inputs 1-$Y_A$ are independent of each other and because system outputs 1-$Y_A$ are independent of each other, each application specific address resolution function 210 therefore represents an independent application control set with a complex control structure. As such, switch fabric 200 can be used to support multiple applications with each application controlled by its own corresponding application control set.

Figure 4:
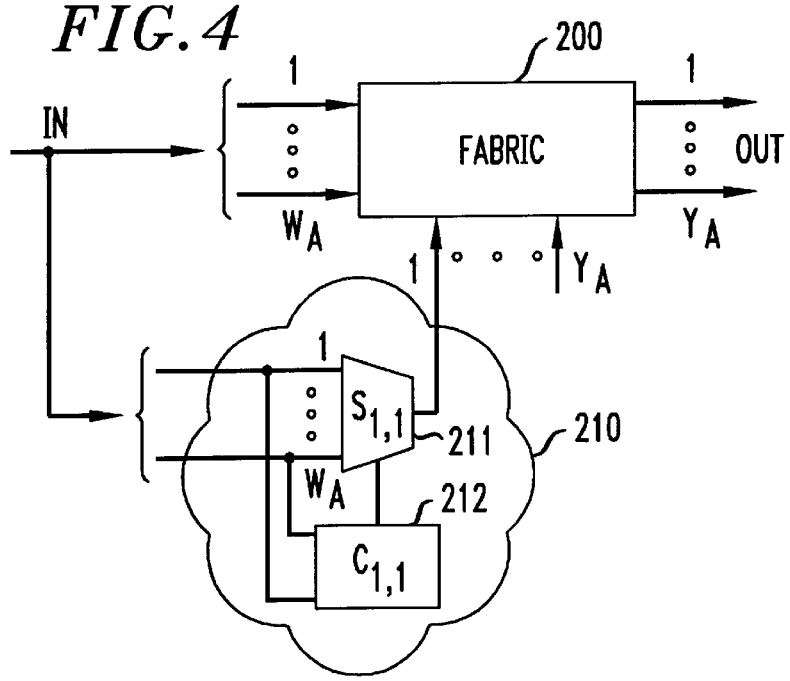
FIGS. 4 through 7 show various multi-stage implementations of the application specific address resolution function shown in FIG. 3.

FIGS. 4–7 show some examples of various multi-stage application specific address resolution function implementations based on the embodiment shown in FIG. 3. These implementations are to be considered illustrative only, since various other configurations may be used depending on the level of control needed for a particular application. Specifically, FIG. 4 shows a single application selection stage application specific address resolution function 210 comprising selector $S_{(1, 1)}$ and associated domain control function $c_{(1, 1)}$. Each input to application specific address resolution function 210 represents the address and signal status information of the system inputs 1-$W_A$, which is provided as a real input to selector $S_{(1,1)}$. Selector $S_{(1,1)}$ chooses an appropriate output from among its real inputs based on a control input from domain control function $c_{(1,1)}$. Selector $S_{(1,1)}$ in turn generates a real output (i.e., the application specific address resolution function output) which is used by switch fabric 200 to make an appropriate selection decision from among the system inputs 1-$W_A$.

Figure 5:
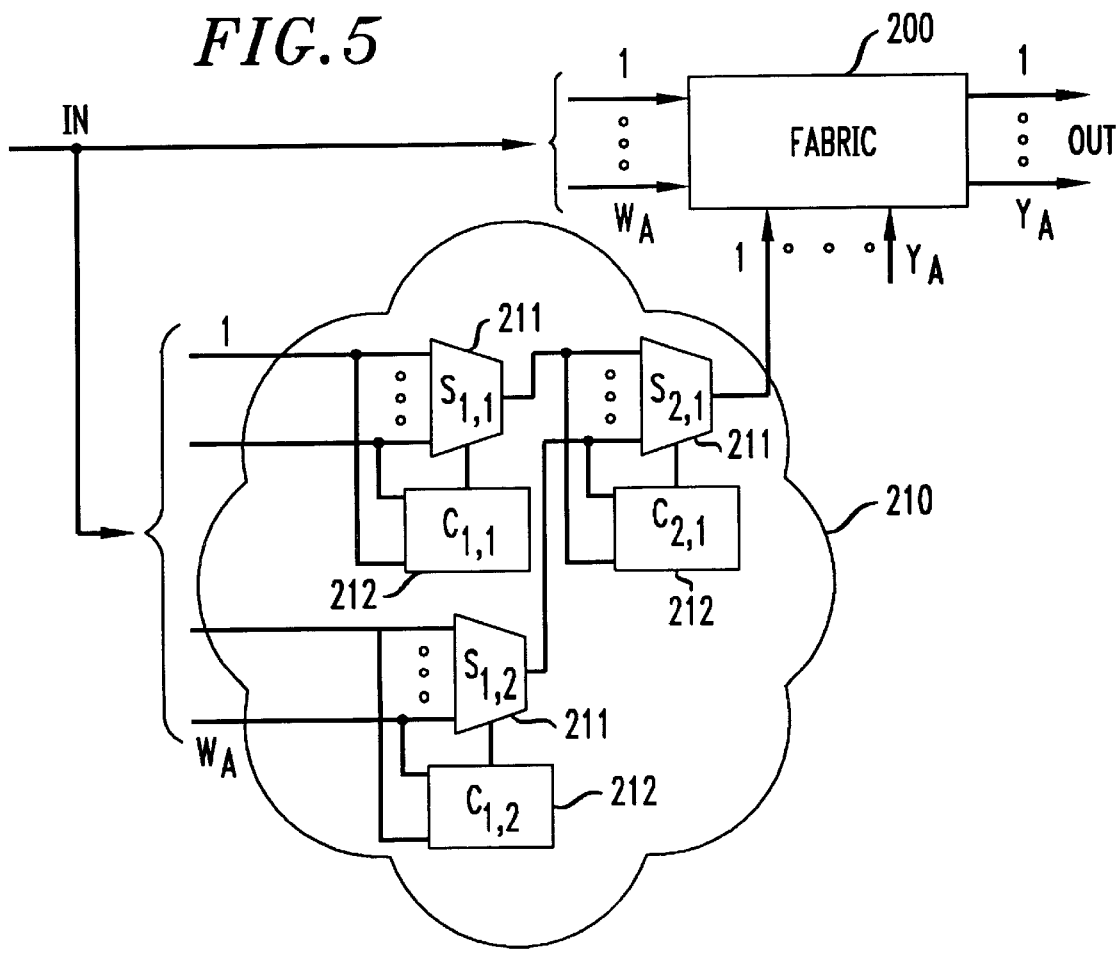

In FIG. 5, a two-stage application specific address resolution function 210 includes selectors $S_{(1,1)}$, $S_{(1,2)}$ with associated domain control functions $c_{(1,1)}$, $c_{(1,2)}$ in the first stage and selector $S_{(2,1)}$ with domain control function $c_{(2,1)}$ in the second stage. Inputs to selectors $S_{(1,1)}$ and $S_{(1,2)}$ are real inputs (i.e., system inputs) while inputs to selector $S_{(2,1)}$ are virtual inputs from previous selectors $S_{(1,1)}$ and $S_{(1,2)}$. Consequently, outputs from selectors $S_{(1,1)}$ and $S_{(1,2)}$ are virtual outputs while the output from selector $S_{(2,1)}$ is a real output. It should be noted that each of the selectors $S_{(1,1)}$ and $S_{(1,2)}$ may receive all or some of the system inputs 1-$W_A$. Furthermore, application specific address resolution function 210 can use domain control functions on a shared basis instead of each selector $S_{(i,j)}$ having its own dedicated domain control function $c_{(i,j)}$. For example, selectors $S_{(1,1)}$ and $S_{(1,2)}$ can share a single domain control function $c_{(1,1)}$ and selector $S_{(2,1)}$ could have its own domain control function $c_{(2,1)}$. Other variations are also possible and are included within the scope of the present invention. All other aspects of application specific address resolution function 210 with respect to control of switch fabric 200 are the same as previously described.

Figure 6:
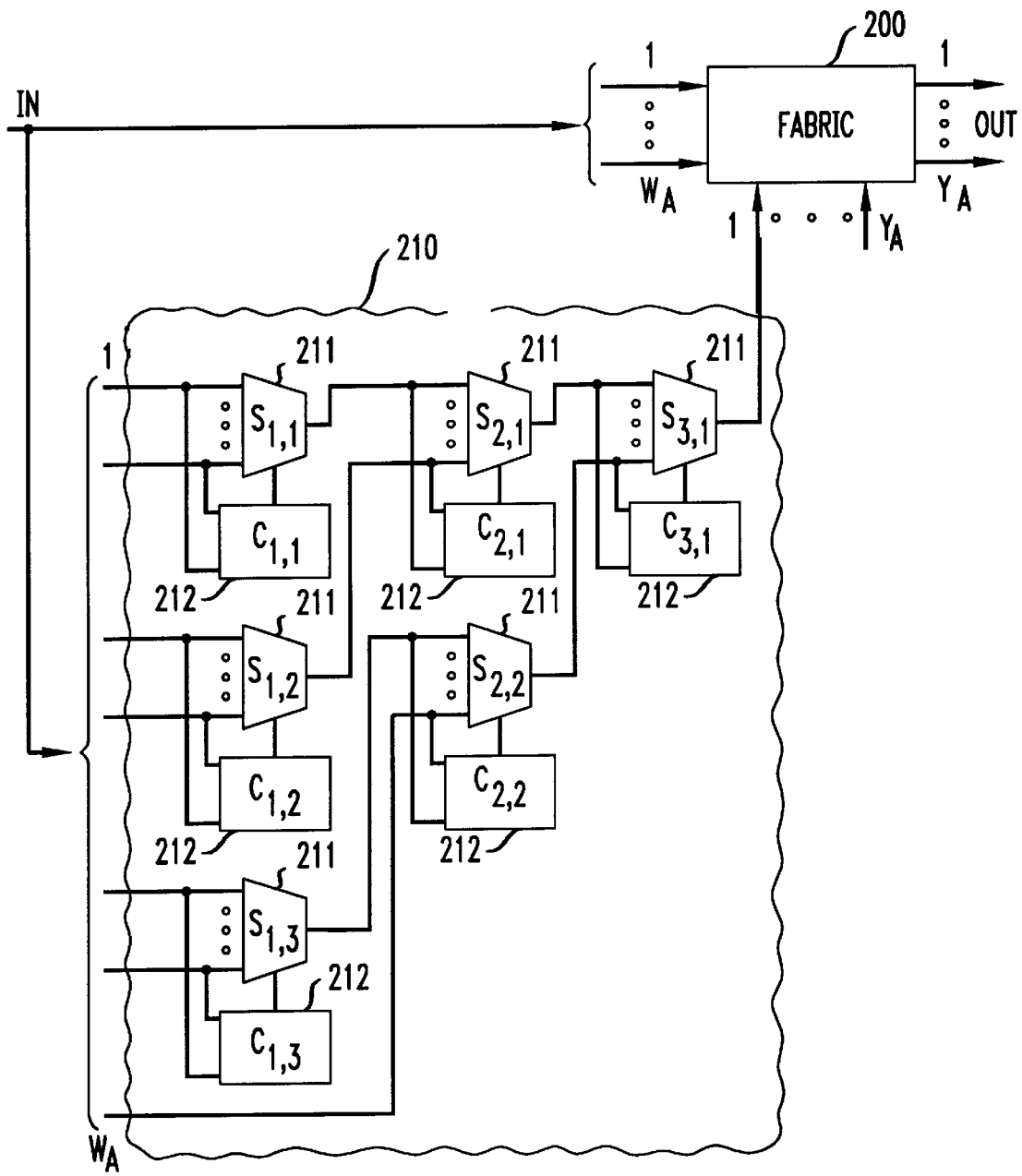

In FIG. 6, three-stage application specific address resolution function 210 includes selectors $S_{(1,1)}$, $S_{(1,2)}$, $S_{(1,3)}$ and associated domain control functions $c_{(1,1)}$, $c_{(1,2)}$, $c_{(1,3)}$ in the first stage, selectors $S_{(2,1)}$, $S_{(2,2)}$ and associated domain control functions $c_{(2,1)}$, $c_{(2,2)}$ in the second stage, and selector $S_{(3,1)}$ with domain control function $c_{(3,1)}$ in the third stage. Inputs to selectors $S_{(1,1)}$, $S_{(1,2)}$, $S_{(1,3)}$, and the bottom input to selector $S_{(2,2)}$ are real inputs while inputs to selectors $S_{(2,1)}$, $S_{(3,1)}$ and the top input to $S_{(2,2)}$ are virtual inputs from previous selectors. Consequently, outputs from selectors $S_{(1,1)}$, $S_{(1,2)}$, $S_{(1,3)}$, $S_{(2,1)}$, and $S_{(2,2)}$ are virtual outputs while the output from selector $S_{(3, 1)}$ is a real output from application specific address resolution function 210 to switch fabric 200. All other aspects of application specific address resolution function 210 are the same as those previously described for the previous embodiments.

Figure 7:
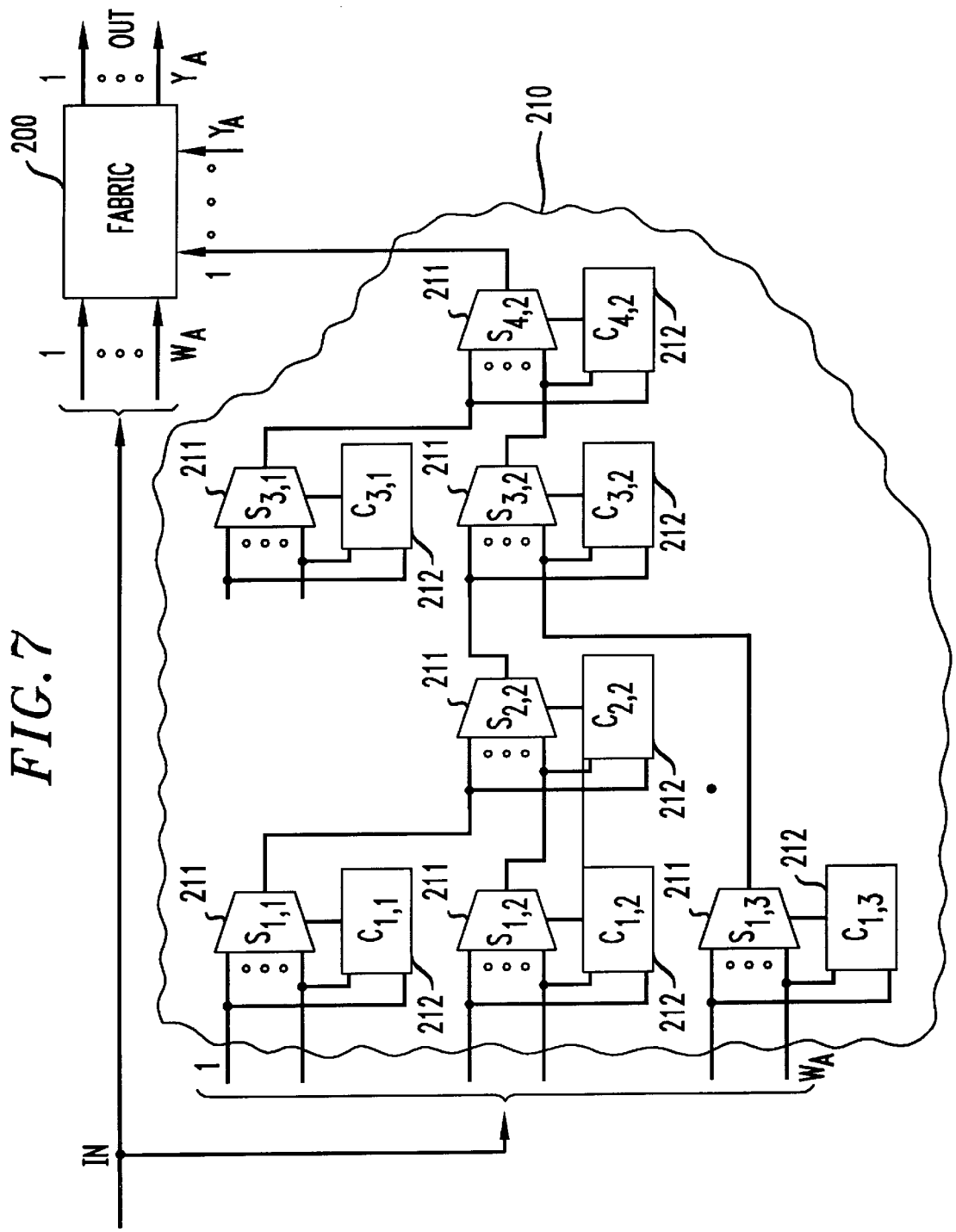

FIG. 7 shows a four-stage application specific address resolution function 210 with selectors $S_{(1,1)}$, $S_{(1,2)}$, $S_{(1,3)}$ and associated domain control functions $c_{(1,1)}$, $c_{(1,2)}$, $c_{(1,3)}$ in the first stage, selector $S_{(2,2)}$ and associated domain control function $c_{(2,2)}$ in the second stage, selectors $S_{(3,1)}$ and $S_{(3,2)}$ with domain control functions $c_{(3,1)}$ and $c_{(3,2)}$ in the third stage, and selector $S_{(4,2)}$ with domain control function $c_{(4,2)}$ in the fourth stage. Inputs to selectors $S_{(1,1)}$, $S_{(1,2)}$, $S_{(1,3)}$, and $S_{(3,1)}$ are real inputs while inputs to selectors $S_{(2,2)}$, $S_{(3,2)}$, and $S_{(4,2)}$ are virtual inputs from previous selectors. Consequently, outputs from selectors $S_{(1,1)}$, $S_{(1,2)}$, $S_{(1,3)}$, $S_{(2,2)}$, $S_{(3,1)}$ and $S_{(3,2)}$ are virtual outputs while the output from selector $S_{(4,2)}$ is a real output from application specific address resolution function 210 to switch fabric 200. All other aspects of application specific address resolution function 210 are the same as those previously described for the previous embodiments.

The application specific address resolution function implementations shown in FIGS. 4–7 are particularly suitable for use in path-in-line protection switching arrangements. Illustratively, application specific address resolution function 210 in FIG. 8 is derived from the four-stage application specific address resolution function implementation shown in FIG. 7. As discussed, software can be used to selectively enable or disable selectors $S_{(i,j)}$ 211 as required. Comparing FIG. 8 to FIG. 7, selectors $S_{(1,1)}$, $S_{(1,2)}$, $S_{(1,3)}$, and $S_{(3,1)}$ are used for the bi-directional line switched ring (BLSR) function, selector $S_{(2,2)}$ is used for the unidirectional path switched ring (UPSR) function, selector $S_{(3,2)}$ is used for the Dual Ring Interworking (DRI) function, and selector $S_{(4,2)}$ is a final override selection stage. As previously noted, the various selectors each may receive some or all of the 1-$W_A$ system inputs. However, in a path-in-line protection switching arrangement, only selected lines from the 1-$W_A$ system inputs would typically be provided to the respective BLSR and UPSR selectors. For example, only those inputs dealing with path control would be provided as input to the UPSR selector. FIG. 8 shows one practical implementation of application specific address resolution function control in path-in-line protection switching in which each selector has its own domain control function.

Specifically, line control is provided for each BLSR selector, path control for the UPSR selector, DRI control for the DRI selector, and override control for the override selector. However, other modifications can be made without departing from the scope of the present invention. For example, each BLSR selector may share a common domain control function for line control and each UPSR selector may share a common domain control function for path control.

In operation, application specific address resolution function 210 of FIG. 8 would perform multiple functions. For example, application specific address resolution function 210 would perform multiple BLSR selection functions on a line switched ring, a UPSR selection function between outputs of the BLSR selection functions, a DRI selection function between the UPSR selection function and a BLSR selection function, and an override selection function between the DRI selection function and a BLSR selection function. The control input from application specific address resolution function 210 would then be used by switch fabric 200 to implement the appropriate protection switching decision.

FIG. 8 shows yet another aspect of the flexibility of the control architecture of the present invention. In general, domain control functions 212 may be responsive to the embedded signal status information as previously described, or alternatively, may be responsive to other control inputs. As shown in FIG. 8, the final selector 211, labeled as SEL 211, may be used to override the system inputs in favor of another type of input, such as a maintenance signal. If a maintenance signal is used to control the selection decision, then appropriate status information could also be included within the signal status information that propagates forward through the system. Thus, domain control provided for selectors can either originate from the embedded signal status information propagating through the system or from other input sources that are local to the particular selector.

Although the present invention has been described in the context of path-in-line protection switching applications for SONET/SDH-based transmission networks, the particular embodiments described above are only to be considered illustrative of the principles of the present invention. Those skilled in the art may devise other suitable implementations without departing from the spirit and scope of the present invention for a number of other applications which may or may not be fabric-based telecommunications applications. For example, the present invention may be suitable for a traffic management system that uses some type of centralized processing mechanism to determine optimal traffic routes. In general, any application that could benefit from providing multiple sources of independent control to a centralized, homogeneous routing structure would be a candidate for the present invention. Accordingly, the scope of the present invention is limited only by the claims that follow.

What is claimed is:

1. A system for providing segmented control of multiple routing applications in a homogeneous routing component, said routing component being adapted to select at least one output signal from among a plurality of input signals, the system comprising:

at least one application-specific control element for controlling one of said multiple routing applications, said at least one application-specific control element being coupled to said routing component, said at least one application-specific control element being responsive to address information and signal status information transported with each of said plurality of input signals, said at least one application-specific control element including a configurable control arbiter for resolving a single control input signal for said routing component based on said signal status information, said control input signal including address information for one of said plurality of input signals;

said routing component being operable to select said one of said plurality of input signals in response to said control input signal; and wherein said control input signal is associated with said at least one output signal, said at least one application-specific control element being operable to independently control one of said multiple routing applications in said routing component using said associated control input signal, and wherein said configurable control arbiter is selectively configurable to support multiple routing domains within said one of said multiple routing applications.

2. The system of claim 1, further including:

at least a second output signal; and at least a second application-specific control element coupled to said routing component, said at least second application-specific control element responsive to said signal status information transported with each of said plurality of input signals, said at least second application-specific control element including a second configurable control arbiter for resolving a second control input signal for said routing component based on said signal status information, said second control input signal including address information for another of said plurality of input signals;

said routing component being operable to select said another of said plurality of input signals in response to said second control input signal; and wherein said second control input signal is associated with said at least second output signal, said at least second application-specific control element being operable to independently control another of said multiple routing applications in said routing component via said associated signals, and wherein said second configurable control arbiter is selectively configurable to support multiple routing domains wit said another of said multiple routing applications.

3. The system of claim 2, wherein said application-specific control elements are implemented with hardware-based logic.

4. The system of claim 2, wherein said application-specific control elements are implemented with software-based logic.

5. The system of claim 1, wherein said routing component comprises a switch fabric.

6. The system of claim 2, wherein each said configurable control arbiter comprises an application specific address resolution means including:

at least one selector means; and at least one domain control means, coupled to said at least one selector means, for generating an appropriate control signal for said at least one selector means in response to said signal status information, said control signal including address information for a selected input signal.

7. The system of claim 1, wherein said plurality of input signals includes system input signals.

8. The system of claim 1, wherein said plurality of input signals includes signals selected from the group consisting of maintenance signals, test signals, and supervisory signals.

9. In a single network element having a homogeneous switch fibric that supports multiple switching applications, said switch fabric being adapted for switching between a plurality of input signals and a plurality of output signals, a control system comprising:
- a plurality of application-specific control elements independently coupled to said switch fabric, said plurality of application-specific control elements being responsive to address information and signal status information transported with each of said plurality of input signals, each of said plurality of application-specific control elements including a configurable control arbiter for resolving a single control input signal for said switch fabric based an said signal status information, said control input signal including address information for a particular input signal;
- said switch fabric being operable to switch between said particular input signals and particular output signals in response to said control input signals; and
- wherein each of said control input signals corresponds on a one-to-one basis with one of said plurality of output signals so that said control input signals are equal in number to said plurality of output signals, each of said plurality of application-specific control elements being operable to independently control one of said multiple switching applications in said switch fabric, and wherein each said configurable control arbiter is selectively configurable to support multiple switching domains of a switching application within its respective application-specific control element.

10. The control system of claim 9, wherein each said configurable control arbiter comprises a multi-stage application specific address resolution means including:
- a plurality of selector means coupled to each other in a specified configuration, said specified configuration having at least one application selection stage; and
- a plurality of individual domain control means selectively coupled to said plurality of selector means, said plurality of individual domain control means being operable to generate appropriate control signals for said plurality of selector means in response to said signal status information, each of said control signals including address information for a selected input signal;
- wherein an aggregation of said plurality of selector means and said plurality of individual domain control means in said specified configuration defines a complex control structure for supporting said multiple switching domains within each of said application-specific control elements.

11. The control system of claim 9, wherein said particular input signal comprises a system input signal, wherein said system input signal is one of said plurality of input signals.

12. The control system of claim 9, wherein said particular input signal comprises a signal selected from the group consisting of maintenance signals, test signals, and supervisory signals.

13. The control system of claim 10, wherein each said configurable control arbiter is operable to sequence and prioritize switching requests for one of said plurality of output signals in said switch fabric.

14. The control system of claim 10, wherein said selected input signal comprises a system input signal, wherein said system input signal is one of said plurality of input signals.

15. The control system of claim 10, wherein said selected input signal comprises a signal selected from the group consisting of maintenance signals, test signals, and supervisory signals.

16. The control system of claim 10, wherein said plurality of individual domain control means are further operable to generate said control signals in response to manual control requests.

17. The control system of claim 10, wherein selected ones of said plurality of selector means are adapted to receive said signal status information directly from said plurality of input signals, said directly received signal status information being representative of real inputs, wherein other selected ones of said plurality of selector means are adapted to receive virtual inputs from other said selector means, said multi-stage application specific address resolution means being operable to generate a single real output from a given selector means in a final application selection stage, said single real output being representative of said control input signal to said switch fabric.

18. The control system of claim 10, wherein each of said plurality of selector means has a corresponding individual domain control means.

19. The control system of claim 10, wherein at least two of said plurality of selector means shares a common individual domain control means.

20. The control system of claim 9, wherein said switch fabric is a bit-sliced hardware fabric.

21. A system for controlling a homogeneous switch fabric in a network element used for a path-in-line protection switching application in a digital transmission network, said switch fabric adapted for switching between a plurality of input signals and at least one output signal, wherein said switch fabric is operable to support additional switching applications, the system comprising:
- at least one application-specific control element coupled to said switch fabric, said at least one application-specific control element responsive to address information and signal status information transported with each of said plurality of input signals, said at least one application-specific control element including a configurable control arbiter for resolving a single control input signal for said switch fabric based on said signal status information, said control input signal including address information for one of said plurality of input signals;
- said switch fabric being operable to switch between said one of said plurality of input signals and said at least one output signal in response to said control input signal; and
- wherein said control input signal is associated with said at least one output signal, said at least one application-specific control element being operable to independently control said path-in-line protection switching application in said switch fabric via said associated control input signal, and wherein said configurable control arbiter is selectively configurable to support multiple switching domains of said path-in-line protection switching application within said at least one application-specific control element, said multiple switching domains including path switching and line switching.

22. The system of claim 21, wherein said digital transmission network is selected from the group consisting of a synchronous optical network (SONET) and a synchronous digital hierarchy network (SDH).

23. The system of claim 21, wherein said plurality of input signals includes system input signals.

24. The system of claim 21, wherein said plurality of input signals includes signals selected from the group consisting of maintenance signals, test signals, and supervisory signals.

25. The system of claim 21, wherein each said configurable control arbiter comprises a multi-stage application specific address resolution means including:
 a plurality of selector means coupled to each other in a specified configuration, said specified configuration having at least one application selection stage; and
 a plurality of individual domain control means selectively coupled to said plurality of selector means, said plurality of individual domain control means being operable to generate appropriate control signals for said plurality of selector means in response to said signal status information, each of said control signals including address information for a selected input signal;
 wherein an aggregation of said plurality of selector means and said plurality of individual domain control means in said specified configuration defines a complex control structure for supporting said multiple switching domains within said at least one application-specific control element.

26. The segmented control system of claim 25, wherein selected ones of said plurality of selector means are associated with a bi-directional line switched ring (BLSR) switching domain and selected ones of said plurality of individual domain control means associated with said BLSR selector means are operable to provide line switching control for the BLSR switching domain, and wherein other selected ones of said plurality of selector means are associated with a unidirectional path switched ring (UPSR) switching domain and other selected ones of said plurality of individual domain control means associated with said UPSR selector means are operable to provide path switching control for the UPSR switching domain.

27. A method of controlling multiple switching applications in a homogeneous switch fabric, said switch fabric adapted for switching between a plurality of input signals and a plurality of output signals, the method comprising the steps of:
 independently coupling a plurality of application-specific control elements to said switch fabric; and
 operating each of said plurality of application-specific control elements to independently control one of said multiple switching applications in said switch fabric by resolving a single control input signal from each of said plurality of individual application-specific control elements to said switch fabric via a configurable control arbiter in response to address information and signal status information transported with each of said plurality of input signals, wherein each of said control input signals includes address information for a particular input signal,
 associating each of said control input signals on a one-to-one basis with one of said plurality of output signals so that said control input signals are equal in number to said plurality of output signals, and
 switching between said particular input signals and particular output signals in response to said associated control input signals using said switch fabric,
 wherein each of said configurable control arbiters is selectively configured to support multiple switching domains of a switching application within each of said plurality of individual application-specific control elements, and wherein each of said plurality of application-specific control elements independently controls one of said multiple switching applications in said switch fabric.

* * * * *